United States Patent
Nakagawa

(10) Patent No.: US 6,475,410 B1
(45) Date of Patent: Nov. 5, 2002

(54) METHOD AND DEVICE FOR PRODUCING CONTACT LENS ELEMENTS AND INJECTION MOLD USED THEREFOR

(75) Inventor: Makoto Nakagawa, Aichi (JP)

(73) Assignee: Tomey Corporation, Nagoya (JP)

( * ) Notice: Subject to any disclaimer, the term of this patent is extended or adjusted under 35 U.S.C. 154(b) by 17 days.

(21) Appl. No.: 09/807,230

(22) PCT Filed: Aug. 30, 2000

(86) PCT No.: PCT/JP00/05933

§ 371 (c)(1),
(2), (4) Date: Apr. 9, 2001

(87) PCT Pub. No.: WO01/15883

PCT Pub. Date: Mar. 8, 2001

(30) Foreign Application Priority Data

Sep. 1, 1999 (JP) .......................................... 11-247143

(51) Int. Cl.[7] ........................... B29C 45/26; B29C 39/26
(52) U.S. Cl. ...................... 264/2.5; 264/2.2; 264/328.8; 425/575; 425/588; 425/808
(58) Field of Search ................................. 425/574, 575, 425/588, 808; 264/2.2, 2.5, 328.8, 219

(56) References Cited

U.S. PATENT DOCUMENTS 5,545,366 A * 8/1996 Lust et al. .................. 264/225
5,716,540 A    2/1998 Matiacio et al.
5,861,114 A    1/1999 Roffman et al.

FOREIGN PATENT DOCUMENTS

| EP | 1 084 181 A1 | 3/2001 |
|----|----|----|
| GB | 2 235 406 A | 3/1991 |
| JP | 4-275110 | 9/1992 |
| JP | 7-80860 | 3/1995 |
| JP | 9-19972 | 1/1997 |
| JP | 9-300371 | 11/1997 |
| JP | 9-323366 | 12/1997 |
| JP | 10-156887 | 6/1998 |
| JP | 10-180830 | 7/1998 |

* cited by examiner

Primary Examiner—Jan H. Silbaugh
Assistant Examiner—Donald Heckenberg
(74) Attorney, Agent, or Firm—Burr & Brown

(57) ABSTRACT

A method and apparatus for producing a contact lens material having two opposite lens-forming surfaces is disclosed. A first resin mold having a molding surface providing one of the opposite lens-forming surfaces of the contact lens material is injection-molded by closing a first and a second die to define at least one mold cavity and injecting a resin material into the mold cavity. A second resin mold having a molding surface is injection-molded by closing a third and a fourth die to define at least one mold cavity and injecting a resin material into the second mold cavity. The dies are separate away from each other and molding material is introduced into one of the resin molds which are held on one of the respective dies. The dies holding the first and second resin molds are moved relative to each other to assemble the first and second resin molds to define a mold cavity for the contact lens material.

10 Claims, 12 Drawing Sheets

(a)

(b)

INJECTION MOLDING (a)

(b)

ROTATING 90°

METHOD AND DEVICE FOR PRODUCING CONTACT LENS ELEMENTS AND INJECTION MOLD USED THEREFOR

BACKGROUND OF THE INVENTION

1. Field of the Invention

The present invention relates to a method and an apparatus for producing a contact lens material, and a die assembly for injection molding used in the method and apparatus. More particularly, the present invention is concerned with such a method for producing the contact lens material which has two opposite lens-forming surfaces and which provides a contact lens or a lens blank which gives the contact lens, wherein steps of injection-molding resin molds in a die assembly, filling a contact lens molding material into the resin molds, and assembling the resin molds together, are effected without removing the resin molds from dies of the die assembly. The present invention also relates to the apparatus used for the method, and the die assembly used for the apparatus.

2. Discussion of the Related Art

In recent years, disposable contact lenses have been widely used by contact lens users on the ground that the disposable contact lenses assure the lens users of easy handling thereof and a high degree of safety with the eyes of the lens users, since the lens users are capable of discarding stained contact lenses and wearing new ones when necessary. Accordingly, the market of such disposable contact lenses has been rapidly expanded.

As a technique for mass-producing such contact lenses at a low cost, there has been practiced a method (mold polymerization method) which uses a pair of molds (mold halves) which respectively give an inner surface (base curved surface) and an outer surface (front curved surface) of an intended contact lens. The pair of molds define therebetween a mold cavity having a configuration following that of the contact lens. The mold cavity is filled with a molding material in the form of a suitable polymeric monomer composition, which is polymerized to form the intended contact lens. Further, there has been practiced another method to produce a contact lens by effecting a simple cutting operation on one of or both of opposite surfaces of a lens blank which has been obtained by a method similar to the above-described mold polymerization method and which has one of the inner and outer surfaces of the intended contact lens, or a lens blank which has been obtained by a method similar to the above-described mold polymerization method and which has a surface and/or surfaces approximating the inner and/or outer surfaces of the contact lens.

The above-described methods for producing a contact lens material which has opposite two lens-forming surfaces and which provides a contact lens or a lens blank that gives the contact lens permit mass-production of the contact lens so as to meet the demand of the market, since these methods reduce a required amount of the monomer and simplify the process steps of producing the contact lens, as compared with a cutting method conventionally effected to produce a contact lens by cutting a block of polymer into an intended configuration of the contact lens.

Some techniques have been proposed in JP-A-9-19972 and JP-A-9-323366, for instance. These publications disclose an apparatus for assembling contact lens molds in which a polymeric monomer mixture is filled so as to form a contact lens. Described in detail, the monomer is introduced into the molds while the molds are transferred, and the molds are assembled together to form the contact lens. JP-A-10-156887 and JP-A-10-180830 disclose a method of uniformly injection-molding molds for forming the contact lens by polymerization of the monomer therein.

In producing the contact lens by the mold polymerization method described above, various attempts have been made to reduce a cost of manufacture of the contact lens, so that the inexpensive disposal contact lenses described above are put on the market. In the above-described methods, the resin molds for forming the contact lens, which include a front-curve mold and a back-curve mold, are formed by using dies, and each of the formed molds is taken out of the corresponding molding cavity defined between the dies. Subsequently, a monomer or a monomer mixture is introduced into a recess of one of the formed front-curve mold and the back-curve mold (generally, the front-curve mold), and the monomer or monomer mixture is polymerized with the two molds being assembled together. Upon completion of the polymerization of the monomer or monomer mixture, the molds are separated away from each other. Then, the formed contact lens article is subjected to a hydration process and an inspection process, to thereby provide an intended contact lens.

In assembling the two molds together for forming the contact lens, the front-curve mold and the back-curve mold tend to be misaligned relative to each other with their axes or centers being offset from each other, giving an adverse influence on the dimension of the contact lens to be obtained, especially the thickness of the central portion of the contact lens. This causes deficiency of the contact lens whose configuration deviates from a certain nominal specification, resulting in a low non-defective ratio of the contact lens.

After the molds have been injection-molded, the molds are removed from the dies, and are relocated for introducing thereinto the polymeric monomer for the contact lens. During the relocation, oxygen may be adsorbed or absorbed on, and dust or dirt may adhere to, the resin surface of the molds, undesirably causing insufficient polymerization of the monomer and undesirable entrance of foreign matters in the contact lens.

SUMMARY OF THE INVENTION

The present invention was developed in the light of the above situations. It is therefore an object of the present invention to provide a method and an apparatus for producing a contact lens material with high dimensional accuracy, and an injection molding die assembly suitably used for the method and apparatus. It is another object of the invention to provide a technique and an apparatus for accurately assembling together two resin molds used for producing the contact lens material. It is also an object of the invention to provide a method and an apparatus for producing the contact lens material with high dimensional accuracy while effectively avoiding or minimizing adverse influences which arise from the use of the resin molds, such as insufficient polymerization of the monomer and adhesion of dust to the resin surfaces of the molds.

The above-indicated objects of the present invention may be attained according to one aspect of the invention, which provides (1) a method of producing a contact lens material which has opposite two lens-forming surfaces and which provides a contact lens or a lens blank which gives the contact lens, the method being characterized by comprising the steps of: (2) injection-molding a first resin mold having a molding surface which provides one of the opposite lens-forming surfaces of the contact lens material, by closing a first die and a second die so as to define at least one mold cavity therebetween, and injecting a suitable resin material into the at least one mold cavity so as to fill the at least one mold cavity; (3) injection-molding a second resin mold having a molding surface which provides the other of the opposite lens-forming surfaces of the contact lens material, by closing a third die and a fourth die so as to define at least one mold cavity therebetween, and injecting a suitable resin material into the at least one mold cavity so as to fill the at least one mold cavity; (4) separating the first and second dies away from each other such that the first resin mold is held on one of the first and second dies with its molding surface being removed from the other of the first and second dies; (5) separating the third and fourth dies away from each other such that the second resin mold is held on one of the third and fourth dies with its molding surface being removed from the other of the third and fourth dies; (6) introducing a molding material which gives the contact lens material into one of the first and second resin molds which are held on the one of the first and second dies and the one of the third and fourth dies, respectively, so that the molding material is accommodated and kept in the one of the first and second resin molds; and (7) moving the one of the first and second dies which holds the first resin mold thereon and the one of the third and fourth dies which holds the second resin mold thereon, relative to each other, for assembling the first and second resin molds together so as to define therebetween a mold cavity for the contact lens material, the mold cavity being filled with the molding material.

In the present method of producing the contact lens material, the first resin mold is held on one of a pair of dies while the second resin mold is held on one of another pair of dies after the first and second resin molds have been injection-molded. With the first and second resin molds being held on the corresponding dies, subsequent process steps are effected to form the contact lens material. Accordingly, the present arrangement permits easy handling, and accurate and easy positioning of the resin molds which inevitably have a small size. For instance, since the positions of the resin molds are fixed, the molding material which gives the contact lens can be accurately poured into the resin molds without a risk of the material flowing out of the resin molds. Further, the present arrangement reduces a required time before the molding material is introduced into the resin molds, so as to accordingly reduce an amount of adsorption of oxygen on the surfaces of the resin molds, which oxygen gives an adverse influence on the polymerization reaction of a monomer composition which is used as the molding material. In addition, the present arrangement effectively avoids or minimizes the adhesion of dust to the resin mold surfaces which was conventionally experienced during relocation of the molds, for thereby preventing the foreign matters from entering the contact lens material. Since the temperature of the die assembly is controlled to accordingly control the temperature of the resin molds fixed to the dies of the die assembly, the resin molds are unlikely to suffer from a variation of the temperature throughout the polymerization process, preventing deterioration of a yield ratio which would be otherwise caused by the temperature variation.

In the present arrangement wherein the first and second resin molds which are fixed and held on the respective dies are assembled together by moving the two mold relative to each other, the resin molds can be accurately positioned relative to each other at the same time when the dies respectively holding the resin mold thereon are accurately positioned, so that the resin molds can be assembled together without their axes or centers being offset relative to each other. Accordingly, the contact lens material to be obtained has a high degree of configurational accuracy.

In one preferred form of the present method for producing the contact lens material, the first and third dies are constituted by a single stationary die while the second and fourth dies are constituted by a single movable die, the stationary and movable dies being assembled together to define the at least one mold cavity for the first resin mold and the at least one mold cavity for the second resin mold, and wherein one of the first and second resin molds which have been injection-molded in the respective mold cavities is held on the stationary die while the other of the first and second resin molds is held on the movable die when the stationary and movable dies are separated away from each other.

According to this arrangement, the first and second resin molds can be concurrently formed between the stationary and movable dies of a single injection molding device in a single injection molding operation. In addition, the stationary and movable dies can be easily moved relative to each other, and the device can be made compact.

In another preferred form of the present method, the step of injection-molding the first resin mold using the first and second dies and the step of injection-molding the second resin mold using the third and fourth dies are effected in respective different injection molding apparatuses.

In the present arrangement wherein the first and second resin molds are injection-molded in the respective different injection molding apparatuses, a multiplicity of the first and second resin molds can be formed at one injection molding operation. Accordingly, a large number of the first resin molds and a large number of the second resin molds are assembled together, so that a large number of the contact lens materials can be formed at one time, resulting in a reduction of the cost of the manufacture.

In still another preferred form of the present method, the molding surface of the second resin mold is a concave surface in the form of a recess into which the molding material in a fluid state is introduced.

According to this arrangement, the molding material for the contact lens material can be easily accommodated and kept in the resin mold.

In a further preferred form of the present method, the molding material is a flowable polymeric material which is polymerized in the mold cavity for the contact lens material defined when the first and second resin molds are assembled together, to thereby provide the contact lens material.

The intended contact lens material is formed by the molding operation by polymerizing the polymeric material described above. Accordingly, the present arrangement satisfies the demand for mass-production of the contact lens material more effectively than the conventional arrangement wherein the contact lens material is formed by the cutting operation.

For advantageously practicing the present method described above, the present invention provides (A) an apparatus for producing a contact lens material which has two opposite lens-forming surfaces and which provides a contact lens or a lens blank which gives the contact lens, the apparatus being characterized by comprising: (B) injection-molding means having a fixedly positioned stationary die and a movable die which are superposed on each other such that the movable die is movable relative to the stationary die in directions toward and away from the stationary die, the stationary and movable dies cooperating with each other to define therebetween at least one first mold cavity for injection-molding a first resin mold having a molding surface which gives one of the opposite lens-forming surfaces of the contact lens material and at least one second mold cavity for injection-molding a second resin mold having a molding surface which gives the other of the opposite lens-forming surfaces, the first resin mold which has been injection-molded in the at least one first mold cavity being held on one of the stationary and movable dies with its molding surface being removed from the other of the stationary and movable dies while the second resin mold which has been injection-molded in the at least one second mold cavity is held on the other of the stationary and movable dies with its molding surface being removed from the one of the stationary and movable dies when the stationary and movable dies are separated away from each other; (C) moving mechanism for moving the stationary and movable dies of the injection-molding means relative to each other, so that the first and second resin molds which are held on one and the other of the stationary and movable dies are opposed with each other in a vertical direction; and (D) molding material supplying means for supplying a molding material which gives the contact lens material, into one of the first and second resin molds which is held on the movable die, so that the molding material is accommodated and kept in the one resin mold.

The moving mechanism of the above-described apparatus permits a linear movement of the stationary and movable dies relative to each other, or a pivotal movement of the stationary and movable dies relative to each other about an axis of the stationary and movable dies.

According to this arrangement, the first and second resin molds can be effectively assembled together.

As another example of the apparatus for practicing the above-described method, the present invention provides (a) an apparatus for producing a contact lens material which has two opposite lens-forming surfaces and which provides a contact lens or a lens blank which gives the contact lens, the apparatus being characterized by comprising: (b) first injection-molding means having a fixedly positioned stationary die and a movable die which are superposed on each other such that the movable die is movable relative to the stationary die in directions toward and away from the stationary die, the stationary and movable dies cooperating with each other to define therebetween at least one first mold cavity for injection-molding a first resin mold having a molding surface which gives one of the opposite lens-forming surfaces of the contact lens material, the first resin mold which has been injection-molded in the at least one first mold cavity being held on the stationary die with its molding surface being removed from the movable die when the stationary and movable dies are separated away from each other; (c) second injection-molding means having a fixedly positioned stationary die and a movable die which are superposed on each other such that the movable die is movable relative to the stationary die in directions toward and away from the stationary die, the stationary and movable dies cooperating with each other to define therebetween at least one second mold cavity for injection-molding a second resin mold having a molding surface which gives the other of the opposite lens-forming surfaces of the contact lens material, the second resin mold which has been injection-molded in the at least one second mold cavity being held on the movable die with its molding surface being removed from the stationary die when the stationary and movable dies are separated away from each other; (d) moving mechanism for moving the stationary die of the first injection-molding means which holds the first resin mold thereon and the movable die of the second injection-molding means which holds the second resin mold thereon, relative to each other, so that the first and second resin molds, which are respectively held on the stationary die of the first injection-molding means and the movable die of the second injection-molding means, are opposed with each other in a vertical direction; and (e) molding material supplying means for supplying a molding material which gives the contact lens material, into the second resin mold which is held on the movable die of the second injection-molding means, so that the molding material is accommodated and kept in the second resin mold.

In the apparatus described above, the moving mechanism permits a linear movement of the stationary and movable dies relative to each other, or a pivotal movement of the stationary and movable dies relative to each other about an axis of the stationary and movable dies.

According to this arrangement, the first and second resin molds can be effectively assembled together.

The present invention is also directed to a die assembly for injection molding used in the above-described method and apparatus, the die assembly being characterized by comprising: a fixedly positioned stationary die, and a movable die which is movable relative to the stationary die in directions toward and away from the stationary die; and at least one first mold cavity for injection-molding a first resin mold having a molding surface which gives one of opposite lens-forming surfaces of a contact lens material, and at least one second mold cavity for injection-molding a second resin mold having a molding surface which gives the other lens-forming surface of the contact lens material, the at least one first mold cavity and the at least one second mold cavity being defined between the stationary and movable dies when the stationary and movable dies are assembled together, and wherein the first resin mold which has been injection-molded in the at least one first mold cavity is held on the stationary die with its molding surface being removed from the movable die while the second resin mold which has been injection-molded in the at least one second mold cavity is held on the movable die with its molding surface being removed from the stationary die.

BRIEF DESCRIPTION OF THE DRAWINGS

The above and optional objects, features and advantages of the present invention will be better understood by reading the following detailed description of presently preferred embodiments of the invention, when considered in connection with the accompanying drawings in which:

FIGS. 10(a) and 10(b) are schematic views showing a pattern of arrangement of two kinds of mold cavities defined by and between a stationary and a movable die which are rotated or pivoted relative to each other about an axis thereof so as to assemble the upper and lower molds together, wherein FIG. 10(a) shows a lower surface of the stationary die, and FIG. 10(b) shows an upper surface of the movable die;

DETAILED DESCRIPTION OF THE PREFERRED EMBODIMENTS

Figure 1:
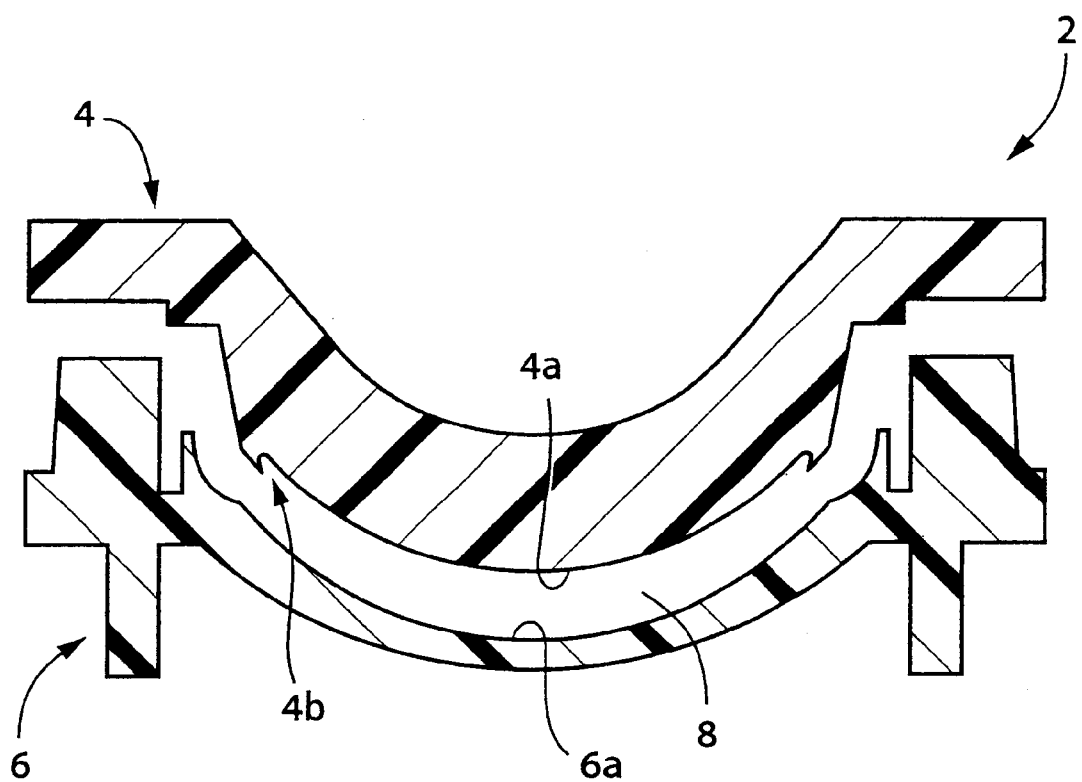
FIG. 1 is a longitudinal cross sectional view showing one example of an upper mold and a lower mold which are used in the method of producing a contact lens material according to the present invention.

To further clarify the present invention, there will be explained in detail specific embodiments of the invention by referring to the drawings.

The contact lens material produced according to the present invention is a contact lens having a final configuration which permits a direct wearing thereof on the lens user's eye, and a lens blank which gives such a contact lens, namely, the lens blank from which an intended contact lens is formed by effecting a machining operation on only one of or both of its opposite surfaces. The contact lens material has opposite two lens-forming surfaces.

Referring to FIG. 1, there is shown a mold assembly 2 for forming the contact lens material in the form of a lens blank for a soft contact lens. One of the opposite surfaces (a base curved surface) of the soft contact lens to be produced from the lens blank is molded while the other surface (a front curved surface) is formed by a machining operation. The mold assembly 2 consists of a first resin mold and a second resin mold in the form of an upper mold 4 (a base-curve mold) and a lower mold 6 (a front-curve mold). The upper and lower mold 4, 6 are assembled together to define therebetween a mold cavity 8 having a configuration which corresponds to that of the intended contact lens material. The upper mold 4 has a convex molding surface 4a which is opposed to the lower mold 6 and which gives one of the opposite lens-forming surface of the lens blank having a configuration corresponding to that of the base curved surface of the intended soft contact lens, while the lower mold 6 has a concave molding surface 6a which is opposed to the upper mold 4 and which gives the other lens-forming surface that will be subjected to a machining operation. Radially outwardly of the convex molding surface 4a which gives the base curved surface of the soft contact lens, there is formed an annular edge-forming portion 4b for forming a beveled or edge portion at an outer periphery of the soft contact lens.

The upper and lower molds 4, 6 of the mold assembly 2 are resin molds formed of a predetermined resin material. The resin material for the resin molds 4, 6 is selected from among those known in the art, by taking into account the cost, moldability, affinity for the molding material for forming the lens blank, and a degree of transmission of a UV-ray when the monomer as the molding material is photopolymerized. For instance, it is preferable to use a resin whose cost is as low as possible since the cost of the resin is inevitably reflected in the price of a final product. For permitting the contact lens as the final product to exhibit the intended optical characteristics and vision correction power, the convex and concave molding surfaces 4a, 6a of the upper and lower molds 4, 6 need to be configured so as to accurately follow the respective molding surfaces of the dies used for molding the upper and lower molds 4, 6. In view of this, the resin material to be used preferably has a high degree of moldability. The affinity between the resin material for forming the upper and lower molds 4, 6 and the molding material for the lens blank is taken into consideration because the molded lens blank would be broken or cracked if the lens blank was not easily removed from the dies, failing to provide the intended molded article (product). When the photopolymerization method is employed for polymerizing the monomer, the degree of transmission of the UV-ray is an important factor in selecting the resin material for the upper and lower molds 4, 6. By considering various factors described above, the resin material for forming the upper and lower molds 4, 6 is suitably selected from among polyethylene, polypropylene, ethylenevinylacetate polymer, propylene copolymer, polystyrene, nylon and others, for instance.

The concave molding surface 6a which is formed at a central portion of the lower mold 6 gives one of the opposite surfaces of the lens blank, which surface is to be subjected to a machining operation after the molding operation of the lens blank by polymerization of the molding material. The concave molding surface 6a has a curvature which permits formation of the front curved surface of the contact lens capable of providing various vision correction powers. The convex molding surface 4a formed at a central portion of the upper mold 4 has a curvature which gives the base curved surface of the contact lens upon molding of the lens blank, and is designed such that the molded surface of the lens blank is sufficiently smooth. The upper and lower molds 4, 6 have a sufficiently small wall thickness at their central mold cavity-defining portions for efficient transmission of heat or light therethrough when the heat polymerization method or photopolymerization method is employed to mold the lens blank. The outer peripheral portion of each of the upper and lower molds 4, 6 is configured to have a sufficiently high degree of rigidity so that the upper and lower molds 4, 6 can be firmly clamped by a chuck of a lathe or turning machine for effecting a machining operation on the molded lens blank after the molds 4, 6 have been separated away from each other.

Figure 2:
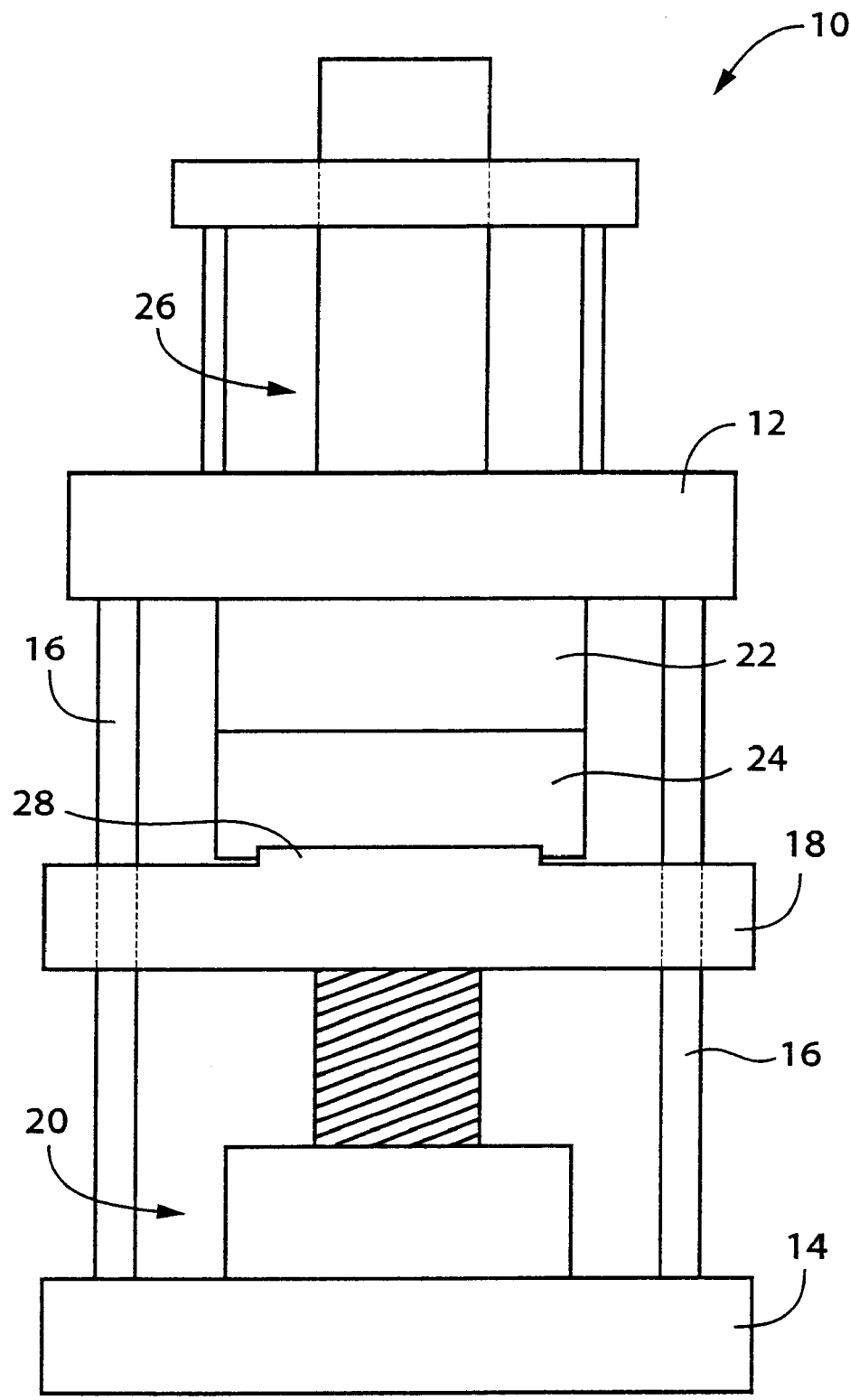
FIG. 2 is a front elevational view showing one example of an injection molding device for injection-molding the upper and lower molds of FIG. 1.

For producing the lens blank (contact lens material) according to the present invention by using the upper and lower molds 4, 6 shown in FIG. 1, there is used a vertical-type injection molding apparatus 10 as shown in FIG. 2, for instance. In the injection molding apparatus 10 of FIG. 2, a stationary platen 12 is supported at its four corners by respective stays 16 which extend upright on a weighing table 14, so that the stationary platen 12 is spaced apart from the weighing table 14 by a suitable distance in a vertical direction of the injection molding apparatus 10. A movable platen 18 is slidably attached to the stays 16 such that it is movable in the vertical direction by a ball screw mechanism 20 driven by a servomotor. A stationary die 22 as one of a pair of dies is attached to a lower surface of the stationary platen 12 while a movable die 24 as the other of the pair of dies is attached to an upper surface of the movable platen 18. On the stationary platen 12, there is disposed an injecting device 26 in which a suitable resin material is plasticized and melted. The resin material is injected from the injecting device 26 through the stationary die 22 into a mold cavity defined between the stationary and movable dies 22, 24. In the thus constructed injection molding apparatus 10, the vertical movement of the movable platen 18 by the ball screw mechanism 20 (for assembling and disassembling the dies 22, 24) and the injecting operation of the injection device 26 to inject the resin material can be established in a structure similar to that in a conventional injection molding apparatus.

Figure 3:
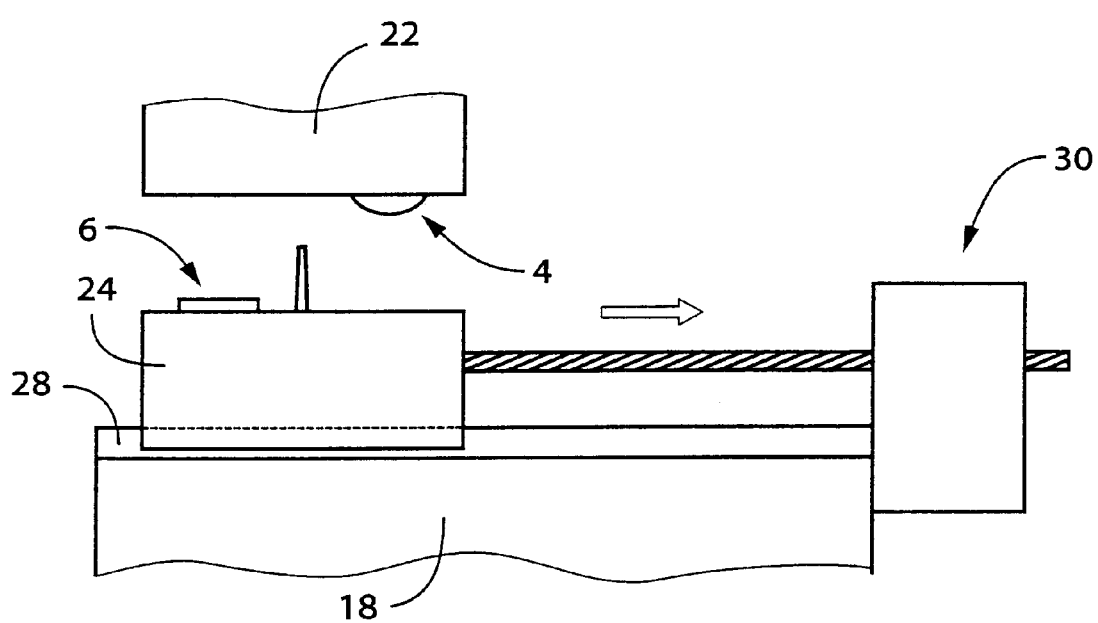
FIG. 3 is a right-hand side elevational view showing a principal part of the injection molding device of FIG. 2.

In the injection molding apparatus 10 described above, the movable die 24 is slidably positioned on a guide rail 28 which is provided on the movable platen 18, such that the movable die 24 is linearly moved in a horizontal direction, as shown in FIG. 3, by a ball screw mechanism 30 driven by the servomotor with the movable die 24 being spaced apart from the stationary die 22. Namely, the movable die 24 is linearly moved by the ball screw mechanism 30 while being guided by the guide rail 28, so that the movable die 24 is appropriately positioned in the horizontal direction.

Figure 4:
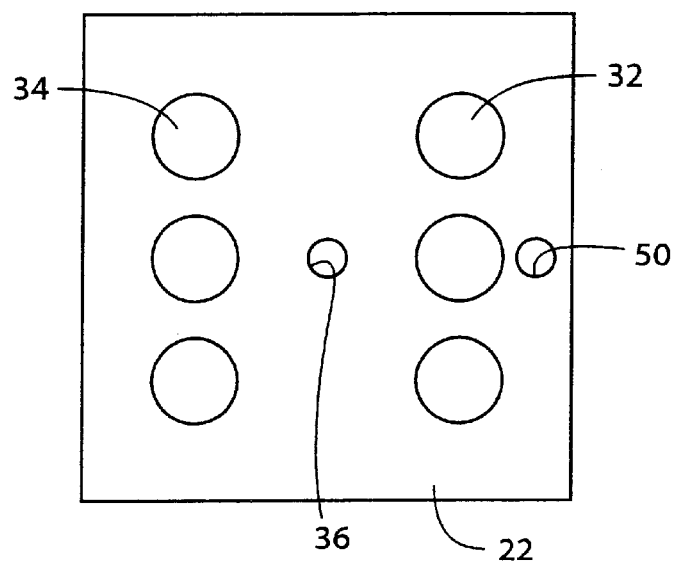
FIGS. 4(*a*) and 4(*b*) are schematic views showing a pattern of arrangement of mold cavities defined by and between a stationary and a movable die of a die assembly of the injection molding device of FIG. 2, wherein FIG. 4(*a*) shows a lower surface of the stationary die, and FIG. 4(*b*) shows an upper surface of the movable die.
Figure 4:
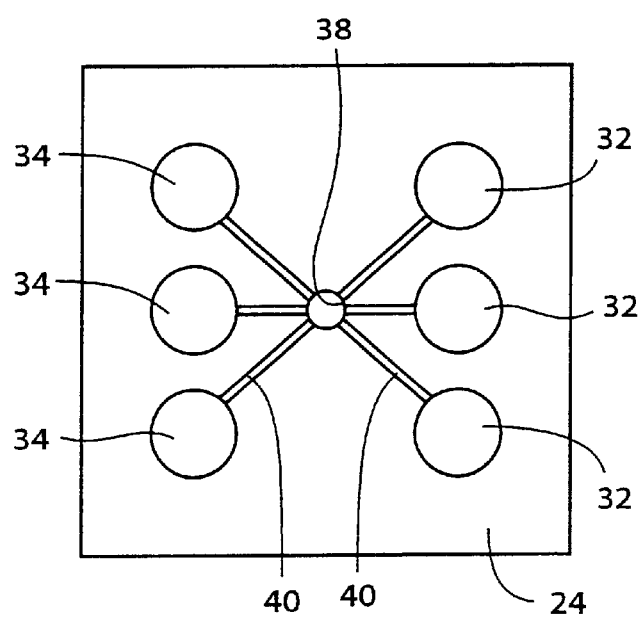

In the present embodiment, when the stationary and movable dies 22, 24 are assembled together, a plurality of mold cavities for the upper mold 4 and a plurality of mold cavities for the lower die 6 are defined between the two dies 22, 24. Described in detail, by assembling together the stationary and movable dies 22, 24, three mold cavities 32 for the upper mold 4 and three mold cavities 34 for the lower mold 6 are defined between the two dies 22, 24, such that an array of the three mold cavities 32 and an array of the three mold cavities 34 are symmetric with each other with respect to a sprue 36 or a sprue hole 38, as shown in FIGS. 4(*a*) and 4(*b*) which respectively indicate a bottom surface (lower surface) of the stationary die 22 and a top surface (upper surface) of the movable die 24. To each of the mold cavities 32, 34, a resin material injected through the sprue 36 is introduced via runners 40.

Figure 5:
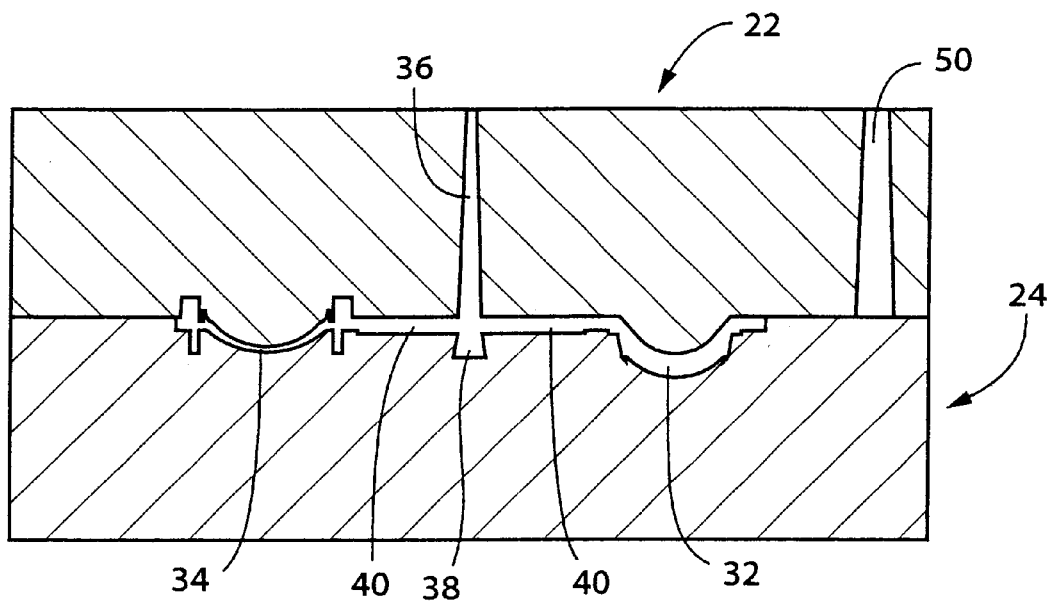
FIG. 5 is a longitudinal cross sectional view of the die assembly of the injection molding device of FIG. 2, wherein the stationary and movable dies are assembled together to define therebetween two kinds of the mold cavities in which a resin is injection-molded.
Figure 5:
Figure 5:
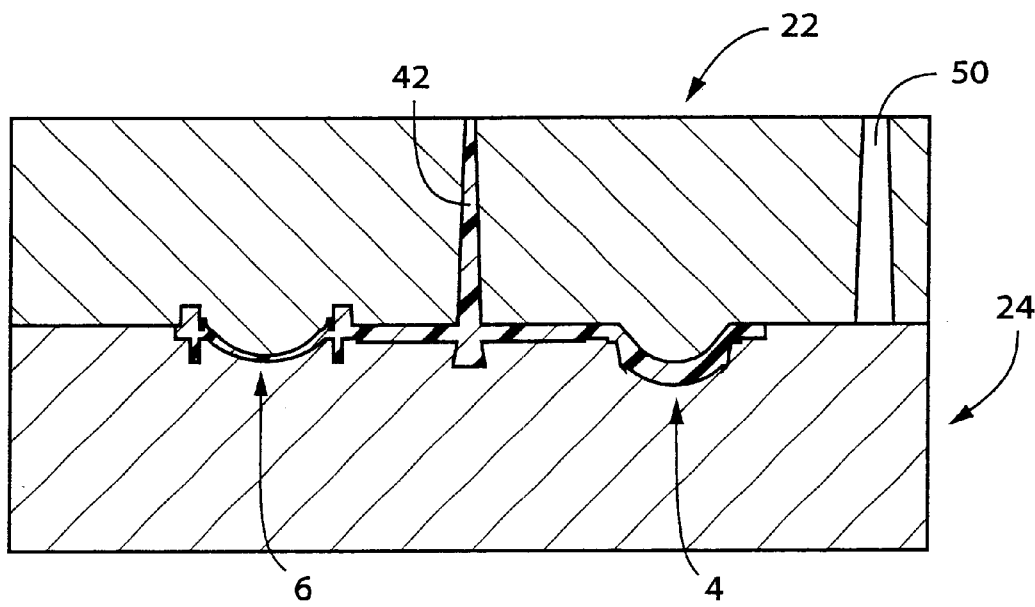

For injection-molding the intended upper and lower molds 4, 6 in the respective mold cavities 32, 34 defined between the stationary and movable dies 22, 24 in the injection molding apparatus 10 described above, the ball screw mechanism 20 is initially activated to move the movable platen 18 in the upward direction, so that the stationary and movable dies 22, 24 are assembled together to define therebetween the mold cavities 32, 34, as shown in FIG. 5. Then, the resin material which has been plasticized and melted by the injecting device 26 is injected therefrom into the sprue 36 formed through the stationary die 22, so that the resin material is introduced into the runners 40 to fill the mold cavities 32, 34. Thus, a plurality of the upper and lower molds 4, 6 (three in the present embodiment) are injection-molded.

Figure 6:
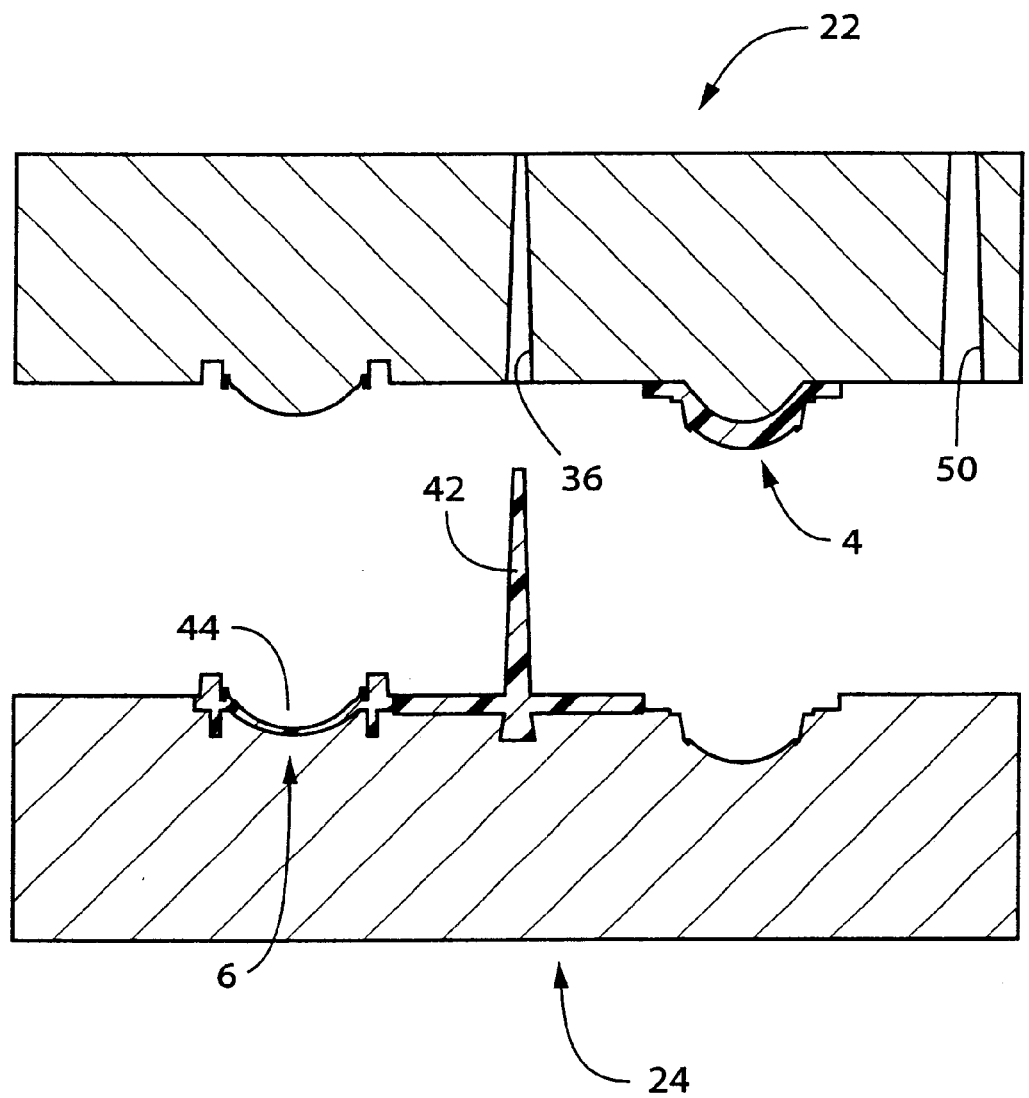
FIG. 6 is a longitudinal cross sectional view of the die assembly, wherein the lower mold is held on the movable die while the upper mold is held on the stationary die when the movable and stationary dies are separated away from each other.

Upon completion of the injection molding operation to form the upper and lower molds 4, 6, the stationary and movable dies 22, 24 are separated away from each other. Described in detail, the ball screw mechanism 20 shown in FIG. 2 is activated to move the movable platen 18 in the downward direction, so that the dies 22, 24 are separated away from each other. The dies 22, 24 are separated away from each other such that the injection-molded upper and lower molds 4, 6 are held one and the other of the stationary and movable dies 22, 24. Described in detail referring to FIG. 6, the upper mold 4 is held on the stationary die 22 with the convex molding surface 4*a* which gives the base curved surface of the lens blank being removed from the movable die 24, while the lower mold 6 is held on the movable die 24 together with the sprue-shaped residual resin 42, with the concave molding surface 6a being removed from the stationary die 22, which concave molding surface 6a gives the front surface of the lens blank to be machined.

For permitting the stationary and movable dies 22, 24 to hold one and the other of the upper and lower molds 4, 6 upon disassembling of the stationary and movable dies 22, 24, various means known in the art can be employed. Each of the injection-molded articles (upper and lower molds 4, 6) can be held on a desired one of the dies by providing an undercut with the desired one of the dies, for instance. Alternatively, each injection-molded article can be held on the desired one of the dies by being removed from the other die such that the injection-molded article is ejected by an ejector pin from the other die. In the present embodiment, the upper mold 4 is ejected by the ejector pin from the movable die 24 so that the upper mold 4 can be effectively held on the stationary die 22. The sprue hole 38 formed in the movable mold 24 functions as an undercut into which the injected resin is introduced and solidified, whereby the lower mold 6 can be held on the movable die 24, together with the sprue-shaped residual resin 42, owing to the resin solidified in the sprue hole 38 functioning as the undercut. The lower mold 6 is not ejected by an ejector pin from the movable die 24 at this stage.

Figure 7:
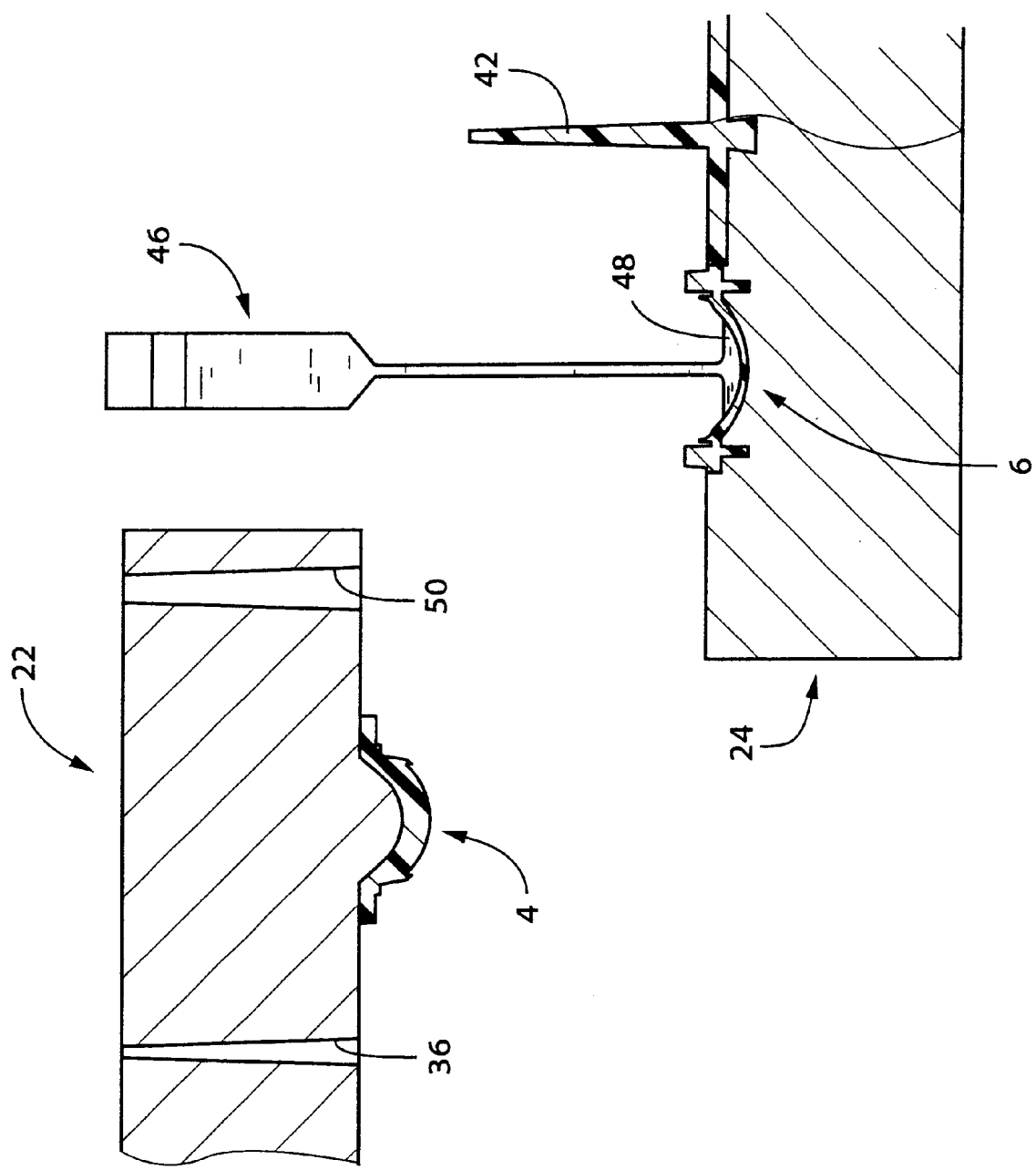
FIG. 7 is a cross sectional view showing a principal part of the die assembly, wherein a monomer mixture is poured into a recess of the lower mold which is held on the movable die.

After the stationary and movable dies 22, 24 have been separated away from each other, a molding material which gives the intended lens blank is accommodated and kept in a recess 44 defined by the concave molding surface 6a of the lower mold 6 which is held on the movable die 24. For permitting the molding material to be easily supplied to the recess 44, the stationary and movable dies 22, 24 are moved relative to each other, as needed. For instance, the movable die 24 is moved relative to the stationary die 22 as shown in FIG. 7, by the ball screw mechanism 30 while being guided by the guide rail 28. In this state, a suitable molding material 48 is supplied from a suitable molding material supply source 46 to the recess 44 of the lower mold 6 in an amount required for forming the intended lens blank.

While the molding material 48 is selected from among any known materials for giving the lens blank, it is generally preferable to use a flowable polymeric material, in particular, a liquid monomer or a mixture thereof. In addition to various known monomers capable of forming the lens blank (resin), polymeric oligomers and macromers can also be used as the molding material 48. In the present embodiment, a monomer mixture consisting of hydroxyethyl methacrylate and methacrylic acid is used as the molding material 48 for forming the lens blank which gives the soft contact lens. The monomer mixture (48) is pumped into the recess 44 of the lower mold 6. Prior to the pumping of the monomer mixture (48) into the recess 44, it is effective to vent the monomer mixture (48) so as to remove therefrom oxygen which prevents the polymerization reaction of the monomer mixture (48), for thereby avoiding insufficient polymerization of the monomer mixture (48), undesirable entrance of a gas in the interface between the monomer mixture (48) and the contacting surface of the upper or lower mold 4, 6, and formation of voids in the molded lens blank.

It is easier to pour the molding material 48 into the lower mold 6 which is held on and fixed to the movable die 24 to fill the recess 44, than to pour the molding material 48 into a lower mold which has been removed from a movable die. The lower mold 6 used for forming the small lens blank which gives the small contact lens is inevitably small-sized. In the present embodiment wherein the lower mold 6 is held on and fixed to the movable die 24, the lower mold 6 can be accurately positioned, facilitating the pouring of the liquid molding material 48 into the recess 44 without a risk of flowing of the molding material out of the lower mold 6.

In the resin which is melted by heat, a gas present therein is gradually removed therefrom during its melting process. Accordingly, the resin surfaces of the formed molds are likely to absorb oxygen. To minimize an adverse influence on the polymerization of the molding material 48 by the oxygen absorbed in the resin surfaces of the molds, it is desirable to use the resin molds as soon as possible after the resin molds have been molded, for polymerizing the molding material 48 therein. In this respect, the molding material 48 is poured into the recess 44 of the lower mold 6 with the lower mold 6 being held on the movable mold 24, permitting the molding operation of the lens blank to be effected quickly after the molds have been formed. Although the surface of the resin mold (lower mold 6) tends to suffer from adhesion of the dust thereto, the lower mold 6 in the present invention is free from such a problem since the lower mold need not be removed from the movable die 24 and relocated for the next process in the present embodiment.

Figure 8:
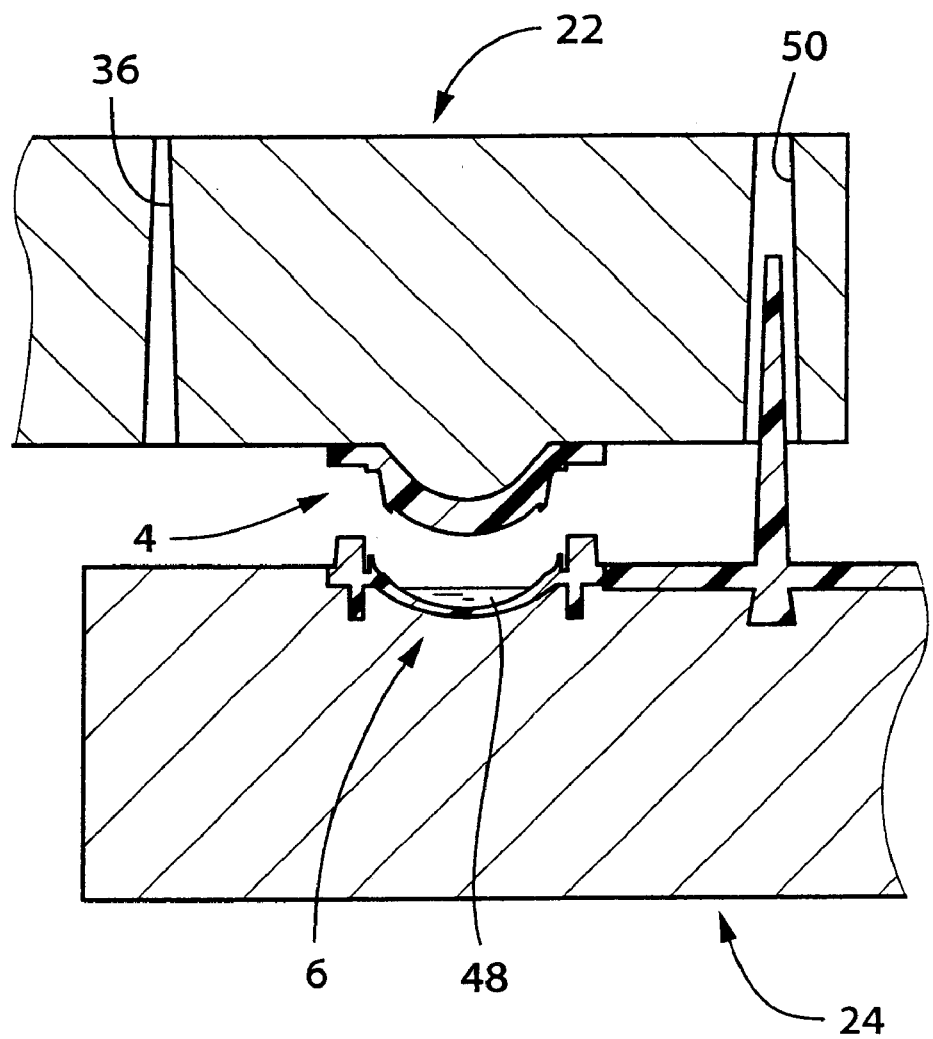
FIG. 8 is a cross sectional view showing a principal part of the die assembly, wherein the upper and lower molds are opposed to each other as a result of relative movement of the movable and stationary dies to each other.

When the molding material 48 has been poured into the recess 44 of the lower mold 6 as described above, the stationary and movable dies 22, 24 are moved relative to each other, such that the upper mold 4 held on the stationary die 22 and the lower mold 6 held on the movable die 24 are located so as to be opposed to each other, as shown in FIG. 8, for closing the upper and lower molds 4, 6 together. In the present embodiment, the movable die 24 slides on the guide rail 28, until the sprue-shaped residual resin 42 which is held on the movable die 24 engages a through-hole 50 formed in the stationary die 22, so that the upper and lower molds 4, 6 are positioned relative to each other. The movable die 24 is slidably moved on the guide rail 28 over a certain distance by the ball screw mechanism 30 driven by the servometer. Accordingly, by electrically controlling the servometer to accordingly control the sliding distance of the movable die 24 on the guide rail 28, the upper and lower molds 4, 6 can be positioned relative to each other.

The upper and lower molds 4, 6 are assembled together with the upper and lower molds 4, 6 being held on the stationary mold 22 and the movable mold 24, respectively. Accordingly, the two molds 4, 6 can be accurately assembled together without their axes or centers being offset from each other. Since the upper and lower molds 4, 6 are held on the stationary and movable dies 22, 24, respectively, as described above, the two molds 4, 6 can be accurately and easily positioned relative to each other, so that the two molds 4, 6 can be held in engagement with each other with high mechanical accuracy. The engagement of the upper mold 4 with the lower mold 6 may be effected under vacuum to prevent air bubbles from being entrapped between the two molds 4, 6. The movable die 24 is moved in the upward direction with the upper and lower molds 4, 6 being opposed to each other, so that the two molds 4, 6 are assembled together. The movable die 24 is further moved toward the stationary die 22 for clamping the upper and lower molds 4, 6 together.

The upper and lower molds 4, 6 are assembled together as described above so as to define the mold cavity (8) for the lens blank, which mold cavity is filled with the molding material 48. In this state, the molding operation for forming the lens blank is effected. When the molding material 48 is a polymeric material such as a monomer mixture, the intended lens blank is molded by polymerization of the monomer mixture.

Figure 9:
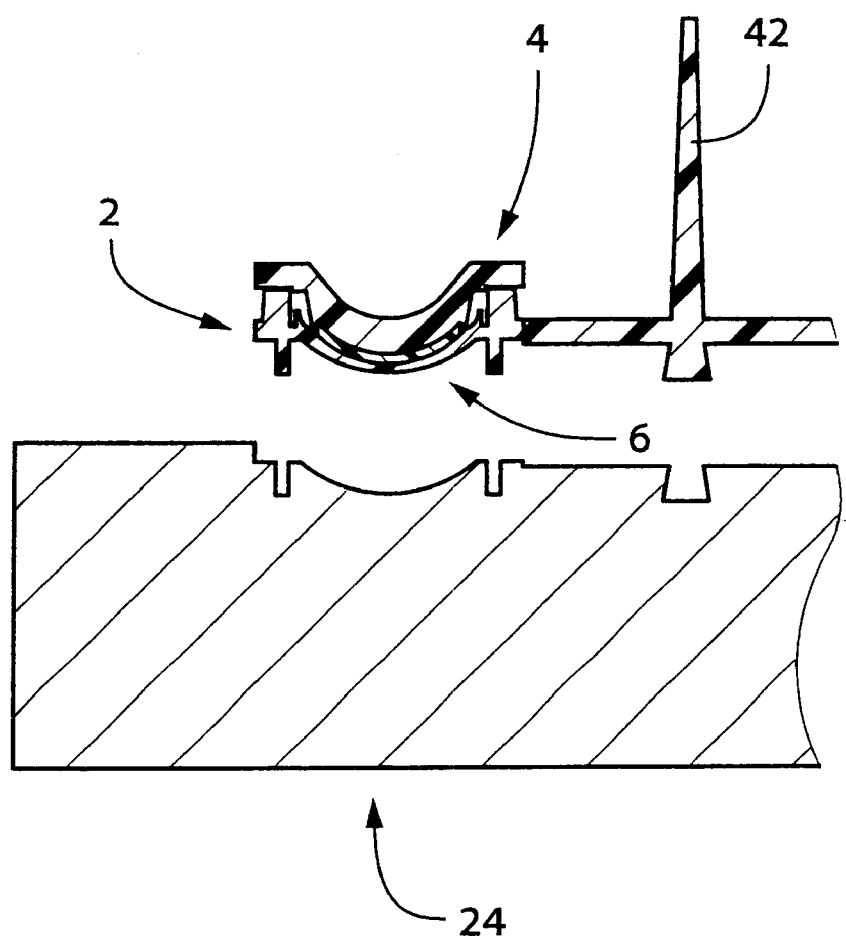
FIG. 9 is a cross sectional view showing a molded contact lens material obtained by polymerization of the monomer mixture in the mold cavity defined by and between the upper and lower molds, wherein the lower mold is removed from the movable die.

Alternatively, after the mold cavity (8) defined between the upper and lower molds 4, 6 has been filled with the molding material 48, the stationary and movable dies 22, 24 may be separated away from each other, and the upper mold 4 held on the stationary die 22 and the lower mold 6 held on the movable die 24 are ejected by the respective ejector pins from the respective dies 22, 24, so that an assembly of the upper and lower molds 4, 6 is removed from the dies 22, 24, as shown in FIG. 9. The molding material 48 in the mold cavity 8 defined between the removed molds 4, 6 is then polymerized by heat or UV irradiation, for instance. In general, the resin is likely to be expanded or deformed by heat. In the present embodiment, however, since the molding operation (polymerization) of the molding material 48 is effected while the upper and lower molds 4, 6 are held on the stationary and movable dies 22, 24, respectively, the upper and lower molds 4, 6 are prevented from being deformed due to heat, resulting in formation of the intended lens blank with considerably high configurational accuracy.

In addition to the heat polymerization and the photopolymerization by the UV irradiation described above, the molding material 48 may be polymerized otherwise. For instance, the molding material 48 in the mold cavity 8 defined between the upper and lower molds 4, 6 is preliminarily polymerized by exposure to heat while the upper and lower molds 4, 6 are in the die assembly of the stationary and movable dies 22, 24. After the upper and lower molds 4, 6 have been taken out of the die assembly, the molding material 48 is exposed to the UV radiation for a time period sufficient for completing the polymerization. For avoiding a shrinkage of the molding material 48 during its polymerization, a clamping force by which the stationary and movable dies 22, 24 are held together is gradually increased, so that the polymerization of the molding material 48 is completed. Any other techniques known in the art can be employed for polymerizing the molding material 48.

After the polymerization of the molding material 48 in the mold cavity (8) defined by and between the upper and lower molds 4, 6 has been completed, the molded lens blank is removed from the upper and lower molds 4, 6. Initially, the lens blank is removed from the lower mold 6 while the lens blank is held on the upper mold 4. The surface of the upper mold 4, on which the molded lens blank is held, is configured to give the optical zone of the base curved surface and the bevel or edge portion of the contact lens, so that the molded lens blank can be held at one of its opposite surfaces in close contact with the upper mold 4 with high stability. The lens blank held by the upper mold 4 is subjected at the other surface thereof to a machining operation to form the optical zone of the front curved surface of the contact lens, such that the contact lens to be obtained has an intended optical power. After the machining operation, the obtained contact lens is removed from the upper mold 4 in a manner similar to that known in the art.

The illustrated embodiment relates to a technique to obtain the intended contact lens by effecting the machining operation on one of the opposite surfaces of the lens blank. When the final product, i.e., contact lens, is obtained upon completion of the polymerization of the molding material, in other words, when the opposite surfaces of the contact lens are formed by molding, the molded contact lens which has been removed from the upper and lower molds 4, 6 is subjected directly to a series of process steps of cleaning, hydration, inspection, packing, and sterilization according to a conventional manner, without effecting the machining operation.

It is to be understood that the present invention is not confined to the details of the illustrated embodiment, but may be embodied with various other changes, modifications and improvements, which may occur to those skilled in the art, without departing from the scope of the invention.

In the illustrated embodiment, three mold cavities 32 for the upper mold 4 and three mold cavities 34 for the lower mold 6 are defined between the stationary and movable dies 22, 24. The present invention may be applicable to the die assembly whose dies define therebetween at least one mold cavity 32 and at least one mold cavity 34. The numbers of the upper and lower molds 4, 6 to be molded at one injecting-molding operation increase with an increase of the numbers of the mold cavities 32, 34 defined between the stationary and movable dies 22, 24, resulting in a large number of contact lens materials (lens blanks) to be molded using the large number of upper and lower molds 4, 6.

Figure 10:
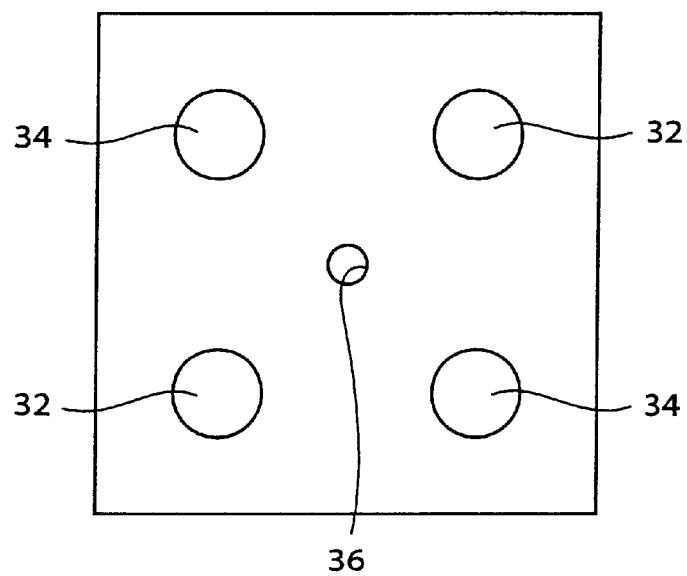
Figure 10:
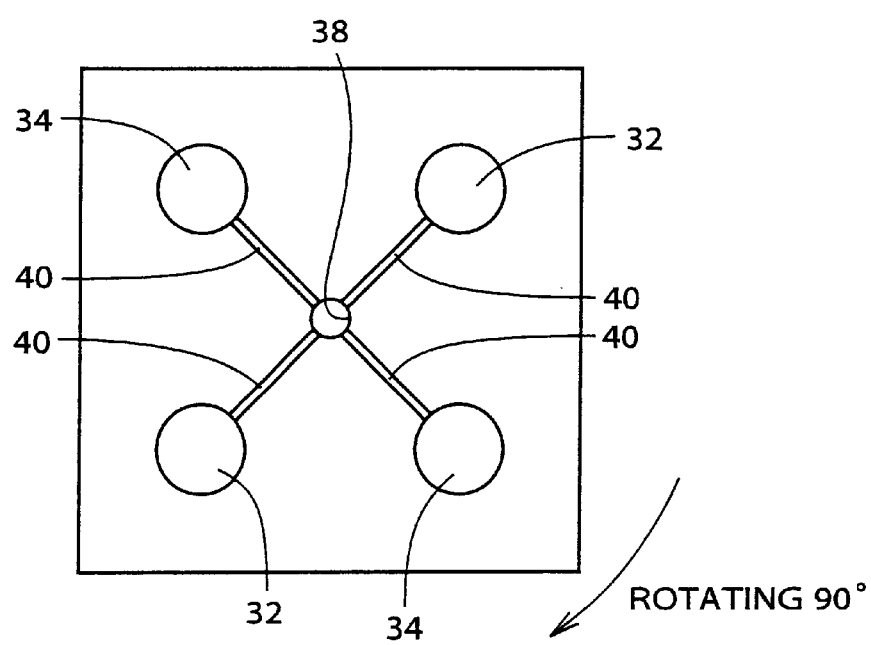

In the illustrated embodiment, the movable die 24 is linearly moved relative to the stationary die 24 for assembling the upper and lower molds 4, 6 together. The movable die 24 may be rotated or pivoted relative to the stationary die 22 for the engagement of the upper and lower molds 4, 6 with each other. FIGS. 10(*a*) and 10(*b*) show a stationary mold 22 and a movable mold 24, respectively, which cooperate with each other to define therebetween two mold cavities 32 for the upper mold 4 and two mold cavities 34 for the lower mold 6, such that the mold cavities 32 and the mold cavities 34 are alternately arranged at a phase angle of 90 degrees. In this arrangement, the movable die 24 is rotated or pivoted through an angle of 90 degrees, so that the lower molds 6 held on the movable die 24 are opposed to the corresponding upper molds 4 held on the stationary die 22. In this state, the upper and lower molds 4, 6 are assembled together.

In the illustrated embodiment, the two kinds of mold cavities 32, 34 are defined between the stationary and movable dies 22, 24 of a single injection molding apparatus 10. The mold cavities 32, 34 may be defined between different pairs of the stationary dies and movable dies of different injection molding apparatuses.

Figure 11:
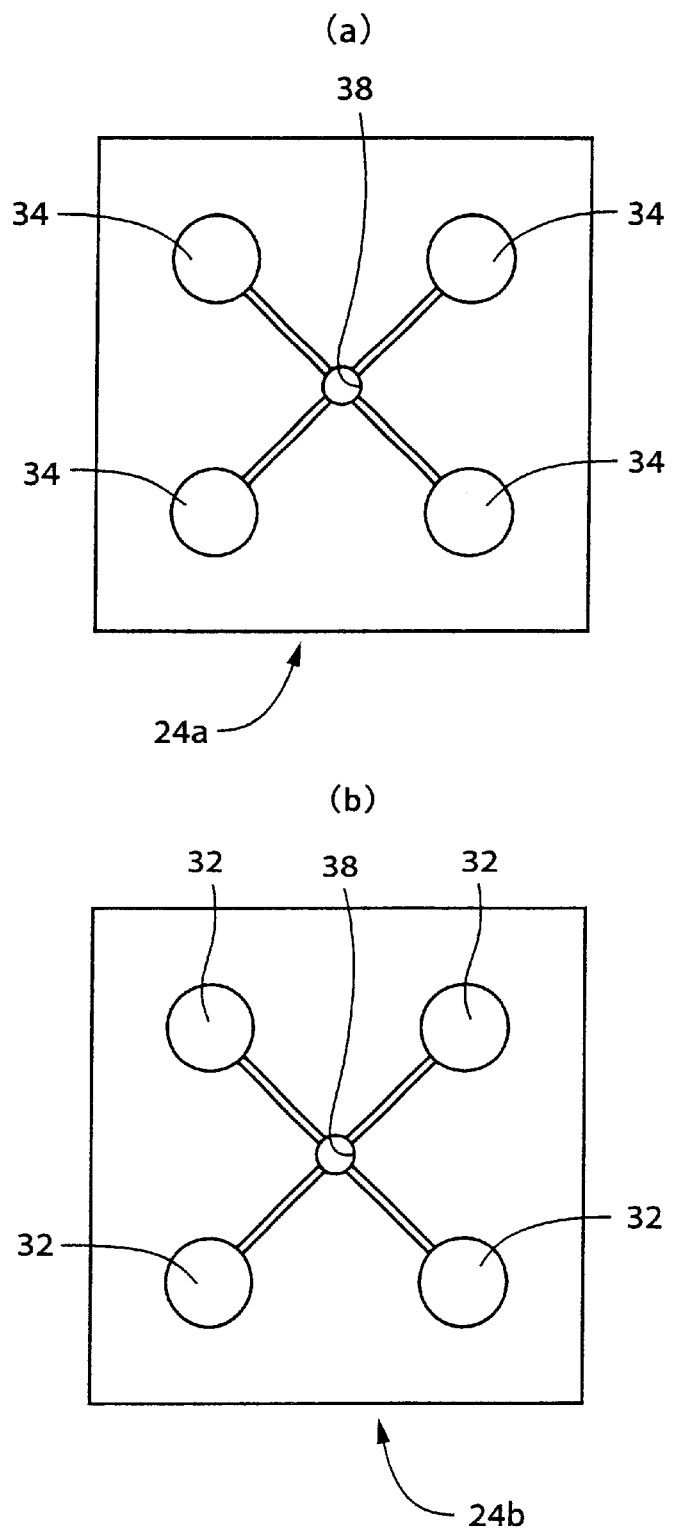
FIGS. 11(a) and 11(b) are schematic views showing patterns of arrangement of two kinds of mold cavities arranged on stationary dies of respective different injection molding devices in an apparatus for producing the contact lens material using two different injection molding devices according to the present invention.
Figure 12:
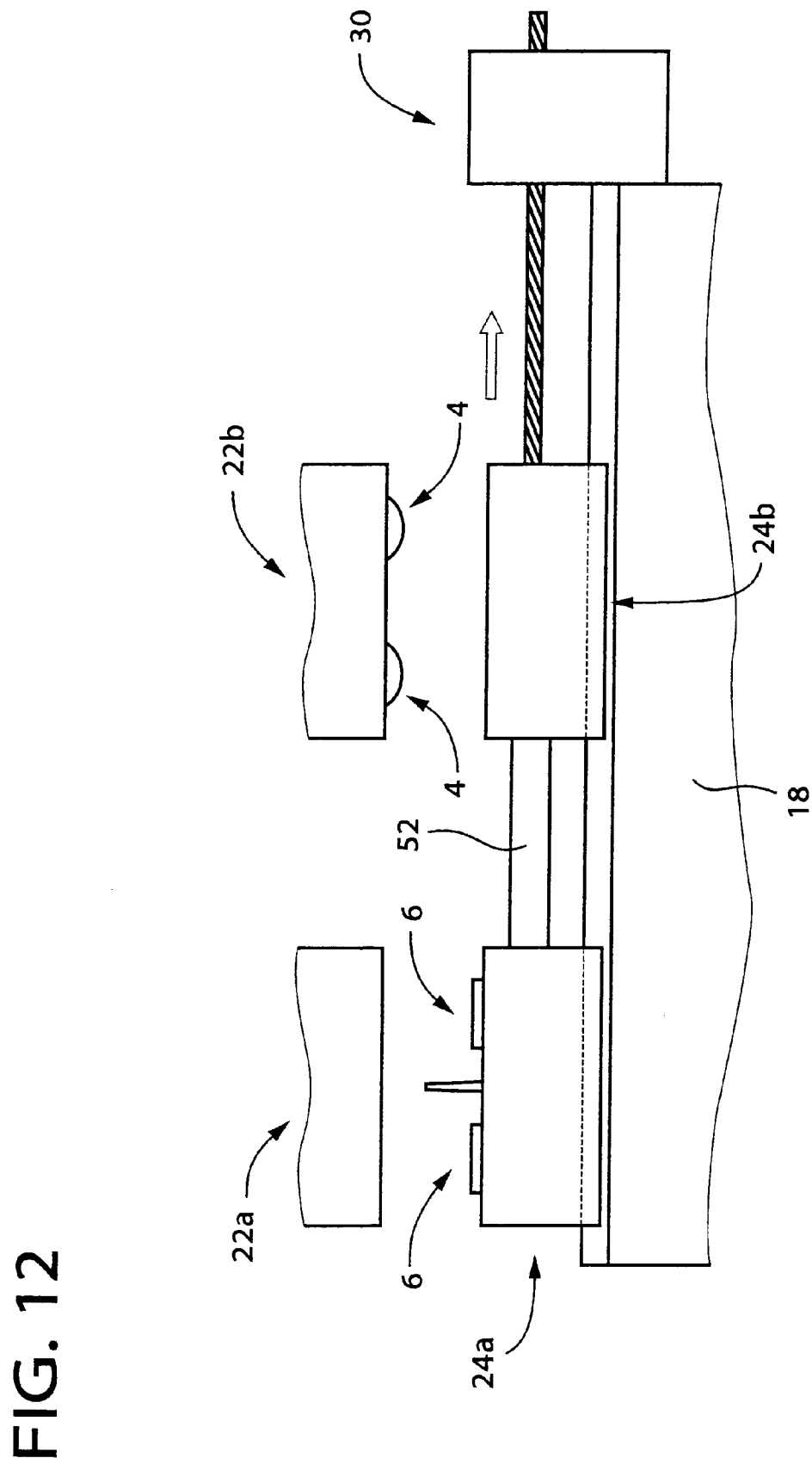
FIG. 12 is a schematic view showing a moving mechanism for moving the movable dies of the present apparatus which uses the two different injection molding devices.

FIG. 11 shows two different movable dies (24) used in separately forming the upper and lower molds 4, 6 by injection molding in two different injection molding apparatuses. Described in detail, a movable die 24*a* shown in FIG. 11(*a*) cooperates with a corresponding stationary die 22*a* to define therebetween four mold cavities 34 for the lower mold 6 such that the four mold cavities 34 are arranged in an equiangularly spaced-apart relationship with one another around the sprue hole 38, while a movable die 24*b* shown in FIG. 11(*b*) cooperates with a corresponding stationary die 22*b* to define therebetween four mold cavities 32 for the upper mold 4 such that the four mold cavities 32 are arranged in an equiangularly spaced-apart relationship with one another around the sprue hole 38. The upper and lower molds 4, 6 are injection-molded in the respective different injection molding apparatuses in a conventional manner. The two movable dies 24*a*, 24*b* in the different injection molding apparatuses are connected to each other by a suitable connecting member 52 as shown in FIG. 12. Then, the two movable dies (24*a*, 24*b*) connected to each other are simultaneously moved by a ball screw mechanism 30, whereby the lower molds 6 held by the movable die 24*a* are held in engagement (assembled with) the upper molds 4 held by the stationary die 22*b*.

Industrial Utility

As is clear from the above description, the present invention is capable of providing a method and an apparatus for assembling the two resin molds together with high accuracy to mold the contact lens material which provides a contact lens or a lens blank. The present invention advantageously provides a technique of improving configurational accuracy of the molded contact lens material and effectively eliminating various problems arising from the use of the resin molds, such as insufficient polymerization and undesirable adhesion of the dust to resin molds. The invention also provides an apparatus and a die assembly for injection molding used for practicing the technique.

What is claimed is:

1. A method of producing a contact lens material which has opposite two lens-forming surfaces and which provides a contact lens or a lens blank which gives said contact lens, said method being characterized by comprising the steps of:

injection-molding a first resin mold having a molding surface which provides one of the opposite lens-forming surfaces of said contact lens material, by closing a first die and a second die so as to define at least one mold cavity therebetween, and injecting a suitable resin material into said at least one mold cavity so as to fill said at least one mold cavity;

injection-molding a second resin mold having a molding surface which provides the other of the opposite lens-forming surfaces of said contact lens material, by closing a third die and a fourth die so as to define at least one mold cavity therebetween, and injecting a suitable resin material into said at least one mold cavity so as to fill said at least one mold cavity;

separating said first and second dies away from each other such that said first resin mold is held on one of said first and second dies with its molding surface being removed from the other of said first and second dies;

separating said third and fourth dies away from each other such that said second resin mold is held on one of said third and fourth dies with its molding surface being removed from the other of said third and fourth dies;

introducing a molding material which gives said contact lens material into one of said first and second resin molds which are held on said one of said first and second dies and said one of said third and fourth dies, respectively, so that said molding material is accommodated and kept in said one of said first and second resin molds; and moving said one of said first and second dies which holds said first resin mold thereon and said one of said third and fourth dies which holds said second resin mold thereon, relative to each other, for assembling said first and second resin molds together so as to define therebetween a mold cavity for said contact lens material, said mold cavity being filled with said molding material.

2. A method according to claim 1, wherein said first and third dies are constituted by a single stationary die while said second and fourth dies are constituted by a single movable die, said stationary and movable dies being assembled together to define said at least one mold cavity for said first resin mold and said at least one mold cavity for said second resin mold, and wherein one of said first and second resin molds which have been injection-molded in the respective mold cavities is held on said stationary die while the other of said first and second resin molds is held on said movable die when said stationary and movable dies are separated away from each other.

3. A method according to claim 1, wherein the step of injection-molding said first resin mold using said first and second dies and the step of injection-molding said second resin mold using said third and fourth dies are effected in respective different injection molding apparatuses.

4. A method according to claim 1, wherein said molding surface of said second resin mold is a concave surface in the form of a recess into which said molding material in a fluid state is introduced.

5. A method according to claim 1, wherein said molding material is a flowable polymeric material which is polymerized in said mold cavity for said contact lens material defined when said first and second resin molds are assembled together, to thereby provide said contact lens material.

6. An apparatus for producing a contact lens material which has two opposite lens-forming surfaces and which provides a contact lens or a lens blank which gives said contact lens, said apparatus being characterized by comprising:

injection-molding means having a fixedly positioned stationary die and a movable die which are superposed on each other such that said movable die is movable relative to said stationary die in directions toward and away from said stationary die, said stationary and movable dies cooperating with each other to define therebetween at least one first mold cavity for injection-molding a first resin mold having a molding surface which gives one of the opposite lens-forming surfaces of said contact lens material and at least one second mold cavity for injection-molding a second resin mold having a molding surface which gives the other of the opposite lens-forming surfaces, said first resin mold which has been injection-molded in said at least one first mold cavity being held on one of said stationary and movable dies with its molding surface being removed from the other of said stationary and movable dies while said second resin mold which has been injection-molded in said at least one second mold cavity is held on the other of said stationary and movable dies with its molding surface being removed from said one of said stationary and movable dies when said stationary and movable dies are separated away from each other;

moving mechanism for moving said stationary and movable dies of said injection-molding means relative to each other, so that said first and second resin molds which are held on one and the other of said stationary and movable dies are opposed with each other in a vertical direction; and molding material supplying means for supplying a molding material which gives said contact lens material, into one of said first and second resin molds which is held on said movable die, so that said molding material is accommodated and kept in said one resin mold.

7. An apparatus according to claim 6, wherein said moving mechanism permits a linear movement of said stationary and movable dies relative to each other, or a pivotal movement of said stationary and movable dies relative to each other about an axis of said stationary and movable dies.

8. An apparatus for producing a contact lens material which has two opposite lens-forming surfaces and which provides a contact lens or a lens blank which gives said contact lens, said apparatus being characterized by comprising:

first injection-molding means having a fixedly positioned stationary die and a movable die which are superposed on each other such that said movable die is movable relative to said stationary die in directions toward and away from said stationary die, said stationary and movable dies cooperating with each other to define therebetween at least one first mold cavity for injection-molding a first resin mold having a molding surface which gives one of the opposite lens-forming surfaces of said contact lens material, said first resin mold which has been injection-molded in said at least one first mold cavity being held on said stationary die with its molding surface being removed from said movable die when said stationary and movable dies are separated away from each other;

second injection-molding means having a fixedly positioned stationary die, and a movable die which is located below said stationary die such that said movable die is movable relative to said stationary die in directions toward and away from said stationary die, said stationary and movable dies cooperating with each other to define therebetween at least one second mold cavity for injection-molding a second resin mold having a molding surface which gives the other of the opposite lens-forming surfaces of said contact lens material, said second resin mold which has been injection-molded in said at least one second mold cavity being held on said movable die with its molding surface being removed from said stationary die when said stationary and movable dies are separated away from each other;

moving mechanism for moving said stationary die of said first injection-molding means which holds said first resin mold thereon and said movable die of said second injection-molding means which holds said second resin mold thereon, relative to each other, so that said first and second resin molds, which are respectively held on said stationary die of said first injection-molding means and said movable die of said second injection-molding means, are opposed with each other in a vertical direction; and molding material supplying means for supplying a molding material which gives said contact lens material, into said second resin mold which is held on said movable die of said second injection-molding means, so that said molding material is accommodated and kept in said second resin mold.

9. An apparatus according to claim 8, wherein said moving mechanism permits a linear movement of said stationary and movable dies relative to each other, or a pivotal movement of said stationary and movable dies relative to each other about an axis of said stationary and movable dies.

10. A die assembly for injection molding characterized by comprising:

a fixedly positioned stationary die, and a movable die which is movable relative to said stationary die in directions toward and away from said stationary die;

at least one first mold cavity for injection-molding a first resin mold having a molding surface which gives one of opposite lens-forming surfaces of a contact lens material, and at least one second mold cavity for injection-molding a second resin mold having a molding surface which gives the other lens-forming surface of said contact lens material, said at least one first mold cavity and said at least one second mold cavity being defined between said stationary and movable dies when said stationary and movable dies are assembled together, and wherein said first resin mold which has been injection-molded in said at least one first mold cavity is held on said stationary die with its molding surface being removed from said movable die while said second resin mold which has been injection-molded in said at least one second mold cavity is held on said movable die with its molding surface being removed from said stationary die.

* * * * *

UNITED STATES PATENT AND TRADEMARK OFFICE
CERTIFICATE OF CORRECTION

PATENT NO.      : 6,475,410 B1
DATED           : November 5, 2002
INVENTOR(S)     : Makoto Nakagawa It is certified that error appears in the above-identified patent and that said Letters Patent is hereby corrected as shown below:

<u>Title page,</u>
Item [56], References Cited, FOREIGN PATENT DOCUMENTS, please change "1 084 181 A1" to -- 1 084 818 A1 --.

Item [57], ABSTRACT,
Line 10, "separate" should read -- separated --.

Signed and Sealed this

Eighteenth Day of February, 2003

JAMES E. ROGAN
*Director of the United States Patent and Trademark Office*